(12) United States Patent
Sedazzari

(10) Patent No.: US 11,726,298 B2
(45) Date of Patent: Aug. 15, 2023

(54) LENS DEVICE

(71) Applicant: OPTO ENGINEERING S.P.A., Mantova (IT)

(72) Inventor: Claudio Sedazzari, Mantova (IT)

(73) Assignee: OPTO ENGINEERING S.P.A., Mantova (IT)

( * ) Notice: Subject to any disclaimer, the term of this patent is extended or adjusted under 35 U.S.C. 154(b) by 77 days.

(21) Appl. No.: 17/036,804

(22) Filed: Sep. 29, 2020

(65) Prior Publication Data
US 2022/0066133 A1    Mar. 3, 2022

(30) Foreign Application Priority Data

Sep. 2, 2020   (IT) .................. 202020000005026

(51) Int. Cl.
*G02B 9/06* (2006.01)
*G02B 7/04* (2021.01)

(52) U.S. Cl.
CPC . *G02B 9/06* (2013.01); *G02B 7/04* (2013.01)

(58) Field of Classification Search
CPC . G02B 9/06; G02B 7/04; G02B 13/22; G02B 13/04; G02B 9/12; G02B 9/16; G02B 9/04–32; G02B 13/00; G02B 15/142–1421; G02B 15/143–143107
USPC ....... 359/237, 298, 315, 319, 682, 689–692, 359/784–795
See application file for complete search history.

(56) References Cited

U.S. PATENT DOCUMENTS

| | | | |
|---|---|---|---|
| 6,771,433 B2* | 8/2004 | Ohashi ............... | G02B 7/025 359/689 |
| 2015/0002946 A1* | 1/2015 | Mori .................. | G02B 13/04 359/755 |
| 2015/0098134 A1* | 4/2015 | Koida ................. | G02B 13/04 359/708 |

(Continued)

FOREIGN PATENT DOCUMENTS

| | | | | |
|---|---|---|---|---|
| DE | 102011012176 A1 * | 8/2012 | ............ | G02B 13/00 |
| EP | 3153848 A1 | 4/2017 | | |
| KR | 20190100775 | * 8/2019 | | |

OTHER PUBLICATIONS

Machine translation of DE 102011012176 A1 retrieved electronically from Espacenet Jun. 30, 2022 (Year: 2022).*

(Continued)

*Primary Examiner* — Cara E Rakowski
(74) *Attorney, Agent, or Firm* — Thomas|Horstemeyer, LLP

(57) ABSTRACT

A lens device for inspecting an object having at least one end surface and at least one lateral surface, substantially orthogonal to the end surface, is provided. The lens device includes a front optical group, a rear optical group acting as prime lens for collecting beams originating from the front optical group, a stop inserted in the rear optical group, and a sensor plane collecting beams projected by the rear optical group. The front optical group includes only refractive lenses and is formed by at least one front lens configured to receive beams both from the at least one end surface of the object, perpendicular to the optical axis, and from the at least one lateral surface of the object, substantially parallel to the optical axis, and by one or more converging lenses arranged behind the front lens and suitable to focus the beams received towards the rear optical group.

18 Claims, 4 Drawing Sheets

(56) References Cited

U.S. PATENT DOCUMENTS

| | | | |
|---|---|---|---|
| 2015/0222883 A1* | 8/2015 | Welch | G02B 27/0172 |
| | | | 348/55 |
| 2017/0013185 A1 | 1/2017 | Gladnick | |
| 2018/0324337 A1* | 11/2018 | Yoshikawa | G02B 7/021 |
| 2020/0117073 A1* | 4/2020 | Nakamura | G02B 13/22 |

OTHER PUBLICATIONS

Machine translation of EP 3153848 retrieved electronically from Espacenet Jun. 29, 2022 (Year: 2022).*

Machine translation of KR 20190100775 retrieved electronically from Espacenet Jan. 30, 2023 (Year: 2023).*

Zav'yalov et al. "A Dedicated Optical System for the Quality Inspection of Cylindrical Surfaces". Russian Journal of Nondestructive Testing. vol. 52, No. 7, pp. 415-420. 2016.

\* cited by examiner

LENS DEVICE

CROSS REFERENCE TO RELATED APPLICATION

This application claims priority to and benefit of Italian Patent Application No. 202020000005026 filed Sep. 2, 2020, the contents of which are incorporated by reference in their entirety.

SUMMARY OF THE INVENTION

An object of the present invention is a lens device designed to inspect objects having at least one end surface (for example, the surface of an upper and/or lower wall) and at least one lateral surface, substantially perpendicular to the end surface. The object to be inspected has, for example, a substantially cylindrical shape.

Another object of the present invention is to provide a lens device capable of simultaneously inspecting the end surface and the lateral surface of the objects.

Yet another object of the present invention is to provide a very clear and accurate image of the end and lateral surfaces of the object while simultaneously keeping the structure of the lens device simple, sturdy, and reliable.

Such objects are achieved by a lens device as described and claimed herein.

BRIEF DESCRIPTION OF THE DRAWINGS

The technical features of the present invention and advantages thereof will become more apparent from the following detailed description, made with reference to the accompanying drawings which show one or more embodiments merely given by way of non-limiting example, in which.

DETAILED DESCRIPTION

Figure 1:
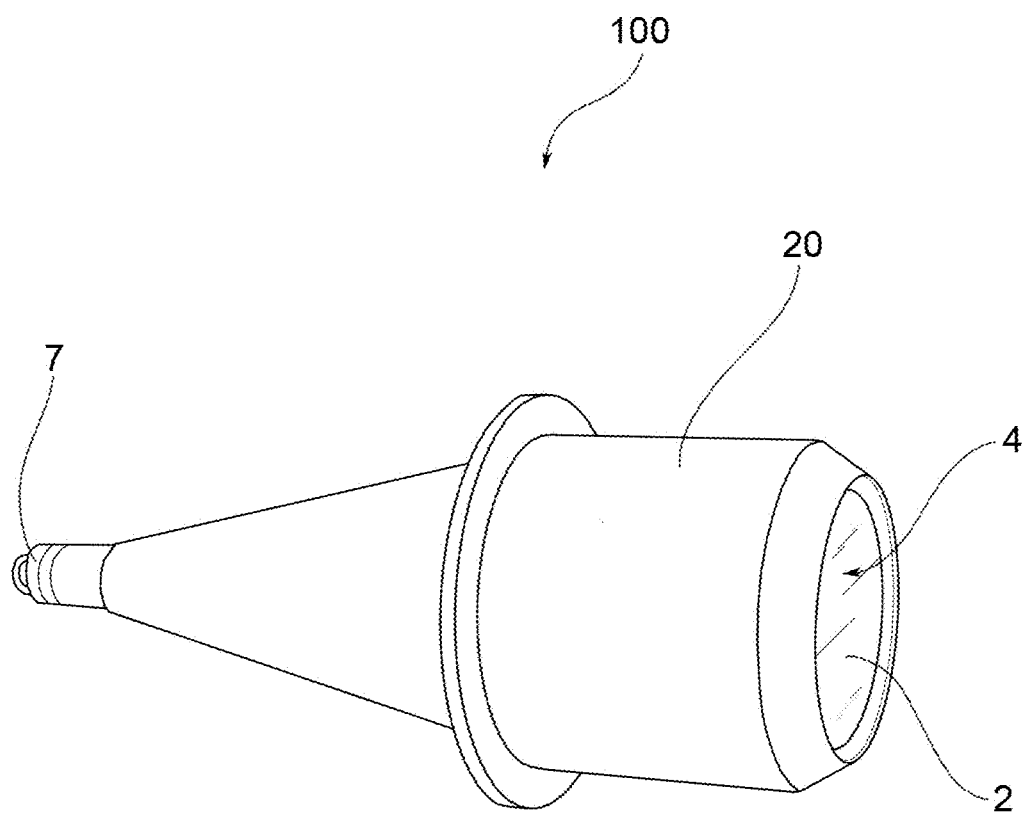
FIG. 1 is a perspective view of a lens device according to the invention.
Figure 2:
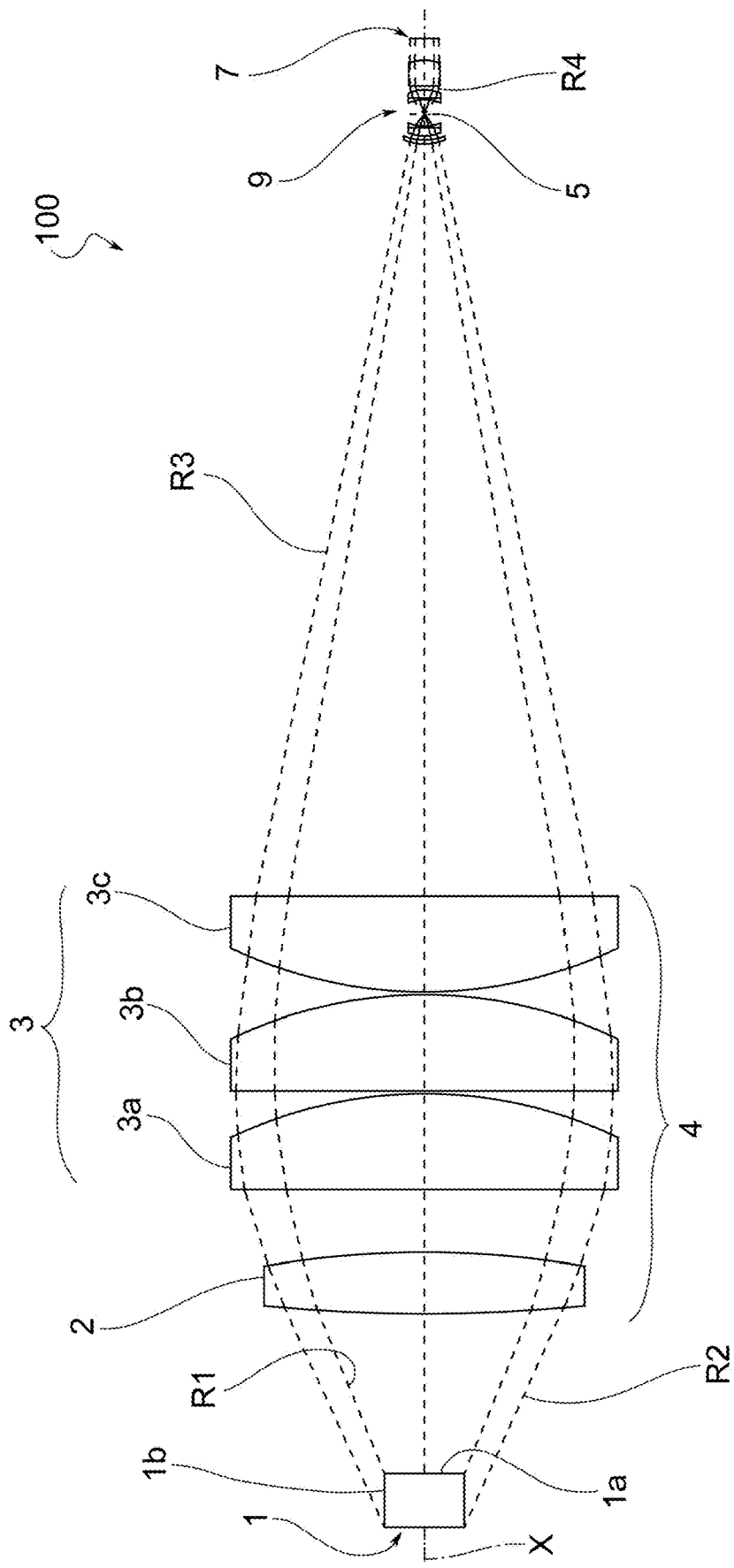
FIG. 2 is an optical diagram of a lens device according to the invention, in an embodiment.

Possible exemplary embodiments of a lens device according to the present invention are indicated, as a whole, in the drawings by 100; 100'.

In the following description, elements which are common to the different embodiments of the lens device are indicated by the same reference numerals.

In a general embodiment, the lens device according to the present invention is designed for inspecting an object 1 having at least one end surface 1a, including a front/upper or rear/lower surface, and at least one lateral surface 1b, substantially orthogonal to the end surface. Within the context of the present disclosure, end surface of the object means a surface which is substantially perpendicular to the optical axis (X) of the lens device.

The lens device 100; 100' comprises a lens device body 20 which develops along an optical axis (X). The lens device body (20) supports a front optical group 4, a rear optical group 9, a stop 5, and a sensor plane 7.

The front optical group 4 receives beams R1, R2 from the object 1.

The rear optical group 9 collects the beams R3 originating from the front optical group 4.

The stop 5 is inserted inside the rear optical group 9.

The sensor plane 7 collects the beams R4 projected by the rear optical group 9.

The front optical group 4 is made up exclusively of refractive lenses and is formed by one or more front lenses 2 configured to receive beams both from an end surface 1a of the object (beams R1), which is perpendicular to the optical axis (X), and from one or more lateral surfaces 1b of the object 1 (beams R2), which are substantially parallel to the optical axis (X), and by one or more converging lenses 3 arranged behind the at least one front lens 2 and suitable to focus the beams received from the at least one front lens 2 towards the rear optical group 9.

The front optical group 4 is configured so that the entrance pupil is external to the lens device. The result is that the objects the furthest from the lens device are enlarged more than those closest to the lens device.

The rear optical group 9 allows the beams originating from various angles captured by the front optical group 4 to be collected and projected over the largest area possible on the sensor plane 7.

In an embodiment, the front optical group 4 is configured so that the object 1 to be inspected is between the entrance pupil and the front optical group 4. Here, the lens device is also called pericentric and allows the outer lateral surfaces of the object 1 to be inspected.

In an alternative embodiment, the front optical group 4 is configured so that the entrance pupil is between the object to be inspected and the front optical group 4. Here, reference is made to hypercentric lens and the image projected onto the sensor is the one of the inner lateral surfaces of the object. In this configuration, for example, inspecting the bottom surface of a cavity is possible. This operating mode is achieved by modifying the internal optics and/or operating distance used.

In an embodiment, the front optical group 4 comprises three converging lenses 3a, 3b and 3c, for example flat-convex lenses.

For example, two front converging lenses 3a, 3b have the convexity facing backward and the third converging lens 3c has the convexity facing forward.

In an embodiment, the front optical group 4 has a double-convex front lens 2.

In an alternative embodiment, at least some of the optical elements 2, 3 of the front optical group 4 is made up of doublets for correcting the chromatic aberrations.

Certain embodiments of the lens device with various focusing methods are now described.

The focusing procedure is performed to obtain the best results according to the object to be inspected.

"Focusing" means having the maximum possible definition of the image projected onto the sensor plane 7. This position is highly dependent on the size of the object and the observation distance. According to the optical and/or mechanical configuration, the following procedures can be implemented in the lens device:

Manual focusing. Here, the focusing is performed by modifying the distance of the sensor plane 7 with respect to the whole system. Usually, spacers in the sensor assembly mechanics are inserted or removed to bring the plane closer or move it away.

Mechanical focusing. Here, the distance between the sensor and the whole optical system is carried out by means of a mechanical mechanism capable of varying the position of the rear optical group 9 or of the stop 5 with respect to the sensor plane 7.

Figure 3:
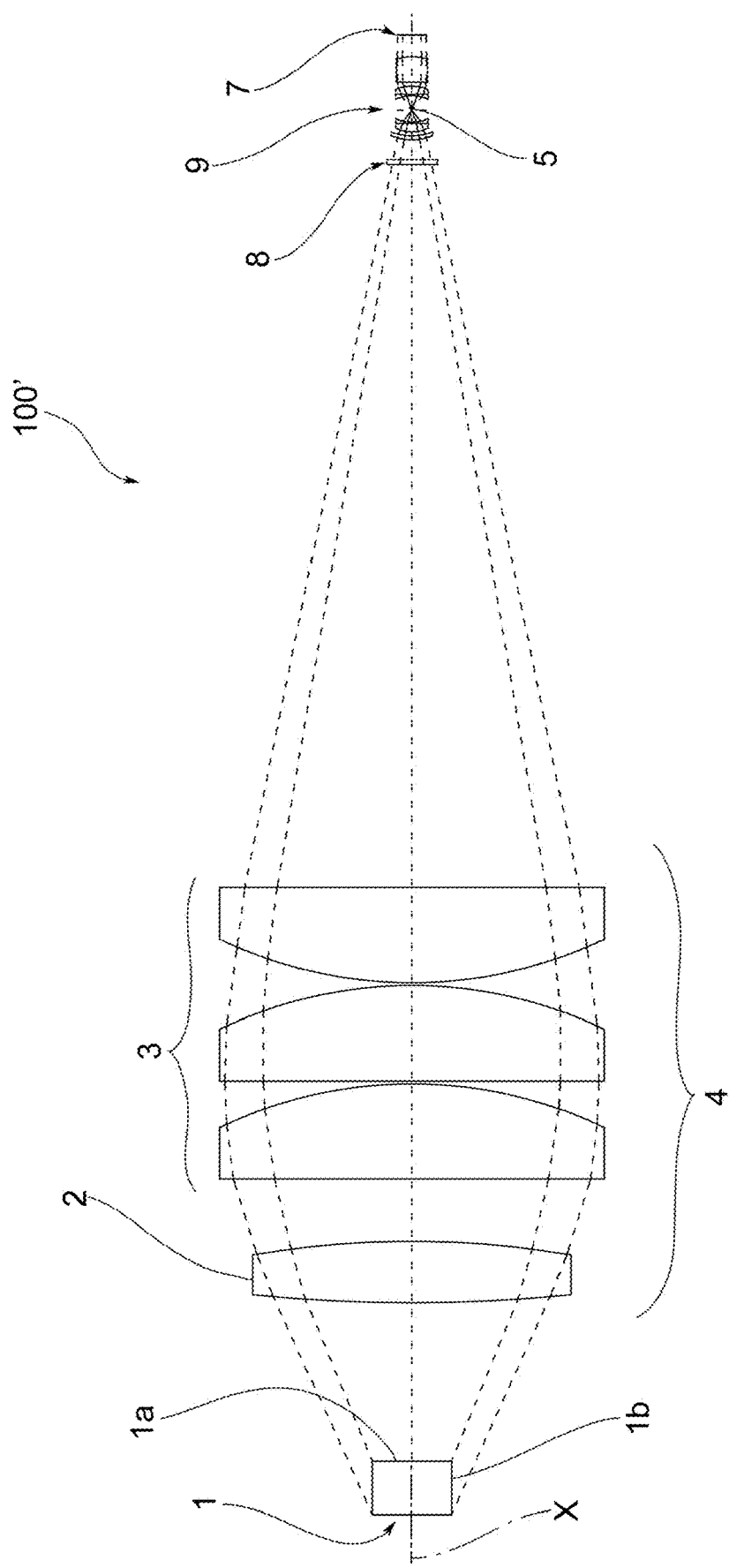
FIG. 3 is an optical diagram of a lens device according to the invention, in an alternative embodiment.

Focusing by means of adaptive lens 8, as shown in the optical diagram in FIG. 3. An adaptive lens 8 is inserted, which is capable of modifying the shape of one of the surfaces thereof by applying an electric current. This mechanism may be controlled via software to perform focusing by means of artificial vision algorithms. The best position of the adaptive element depends on the features of the front 4 and rear 9 optical groups. The advantage of this implementation lies in being able to vary the specifications of the lens device within certain limits without resorting to further optical or mechanical additions, and especially without performance worsening.

Therefore, in an embodiment, the lens device comprises adjustment means of the position of the sensor plane 7 along the optical axis (X) in order to manually focus the lens device.

In an alternative embodiment, the lens device is provided with adjustment means of the position of the ocular optics 6 along the optical axis (X) in order to mechanically focus the lens device.

In a further alternative embodiment, the lens device is provided with an adaptive lens 8 which is electrically controllable to adjust the focusing of the lens device.

Figure 4:
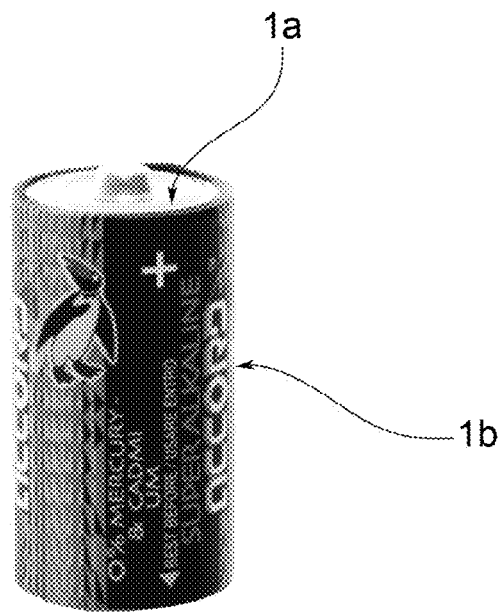
FIG. 4 is an elevation view of an example of object to be inspected.
Figure 4A:
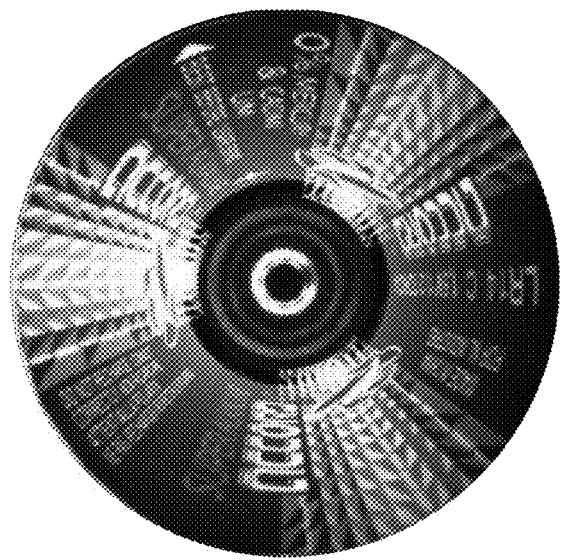
FIG. 4a shows the image provided by the lens device, of the object in FIG. 3.

The lens device according to the present invention operates at an operating distance from the object which depends on the acceptance size of the lens device, in particular length and diameter. If the object is at the correct operating distance, the lens device projects the front and lateral surfaces thereof onto the image sensor, as shown in FIGS. 4 and 4a. The advantage of this lens device with respect to multi-camera systems is the possibility of using a single optics to obtain several views of the object to be controlled, making the inspection easier and less costly. Moreover, there is no need for any perspective correction required by multi-camera systems.

Therefore, there is no need for multiple cameras positioned around and above the object. The image analysis is very quick because there is no need for any image-matching software since the image acquired is continuous rather than segmented.

There is no perspective effect which is typical of multi-camera systems.

The objects inspected may slide easily below the lens device.

Therefore, the invention thus conceived achieves the preset objects.

Obviously, the practical embodiment thereof may also take on other shapes and configurations than that shown above without departing from the scope of protection as described and claimed herein.

Moreover, all details may be replaced by technically equivalent elements, and any size, shape and material may be used according to the needs.

What is claimed is:

1. A lens device for inspecting an object having at least one end surface and at least one lateral surface, substantially orthogonal to the at least one end surface, the lens device comprising:
   a lens device body which develops along an optical axis (X) and, carried by the lens device body, a front optical group, a rear optical group acting as prime lens for collecting beams originating from the front optical group, a stop inserted inside the rear optical group, and a sensor plane collecting beams projected by the rear optical group,
   wherein the front optical group comprises only refractive lenses and is formed by at least one front lens configured to receive beams both from the at least one end surface of the object, perpendicular to the optical axis (X), and from the at least one lateral surface of the object, substantially parallel to the optical axis (X), and by one or more converging lenses arranged behind the at least one front lens and suitable to focus the beams received from the at least one front lens towards the rear optical group, the front optical group being configured so that an entrance pupil is external to the lens device,
   wherein the at least one front lens of the front optical group comprises a first lens facing the object, the first lens of the at least one front lens being a double-convex lens that is formed as a single continuous component,
   wherein the one or more converging lenses of the front optical group comprises three flat-convex converging lenses or three flat-convex doublets suitable to correct chromatic aberrations.

2. The lens device of claim 1, wherein the front optical group is configured so that the object to be inspected is between the entrance pupil and the front optical group.

3. The lens device of claim 2, wherein the front optical group comprises flat-convex lenses.

4. The lens device of claim 2, wherein the front optical group comprises optical elements made up of doublets to correct chromatic aberrations.

5. The lens device of claim 2, wherein the front optical group comprises two front converging lenses with convexity facing backward, and a third converging lens with convexity facing forward.

6. The lens device of claim 1, wherein the front optical group is configured so that the entrance pupil is between the object to be inspected and the front optical group.

7. The lens device of claim 6, wherein the front optical group comprises flat-convex lenses.

8. The lens device of claim 6, wherein the front optical group comprises optical elements made up of doublets to correct chromatic aberrations.

9. The lens device of claim 6, wherein the front optical group comprises two front converging lenses with convexity facing backward, and a third converging lens with convexity facing forward.

10. The lens device of claim 1, wherein the front optical group comprises optical elements made up of doublets to correct chromatic aberrations.

11. The lens device of claim 1, wherein the front optical group comprises two front converging lenses with convexity facing backward, and a third converging lens with convexity facing forward.

12. The lens device of claim 1, further comprising an adaptive lens which is electrically controllable to adjust focusing of the lens device.

13. The lens device of claim 1, further comprising removable spacers in the sensor assembly mechanics configured to be inserted or removed to adjust the position of the sensor plane along the optical axis (X) to manually focus the lens device.

14. The lens device of claim 1, further comprising a mechanical mechanism capable of varying the position of the rear optical group along the optical axis (X) to mechanically focus the lens device.

15. The lens device of claim 1, wherein the front optical group comprises flat-convex lenses, and optical elements made up of doublets to correct chromatic aberrations.

16. The lens device of claim 1, wherein the front optical group comprises flat-convex lenses, two front converging lenses with convexity facing backward, and a third converging lens with convexity facing forward.

17. The lens device of claim 1, wherein the front optical group comprises flat-convex lenses, optical elements made up of doublets to correct chromatic aberrations, two front converging lenses with convexity facing backward, and a third converging lens with convexity facing forward.

18. The lens device of claim 1, wherein the front optical group comprises three converging lenses.

\* \* \* \* \*